US008533531B2

(12) United States Patent
El Mahdy et al.

(10) Patent No.: US 8,533,531 B2
(45) Date of Patent: Sep. 10, 2013

(54) MULTIMEDIA HARDWARE EMULATION FOR APPLICATION TESTING

(75) Inventors: Mona W. El Mahdy, Bellevue, WA (US); Akshay Johar, Bellevue, WA (US); Eduardo J. Leal-Tostado, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 12/797,631

(22) Filed: Jun. 10, 2010

(65) Prior Publication Data

US 2011/0307739 A1  Dec. 15, 2011

(51) Int. Cl.
*G06F 11/00* (2006.01)

(52) U.S. Cl.
USPC .............................. 714/28; 714/25; 714/38.1

(58) Field of Classification Search
USPC ........................... 714/25, 38, 38.1, 40, 44, 28
See application file for complete search history.

(56) References Cited

U.S. PATENT DOCUMENTS

| | | | |
|---|---|---|---|
| 5,717,903 A | 2/1998 | Bonola | |
| 5,889,988 A * | 3/1999 | Held | 718/103 |
| 7,552,450 B1 * | 6/2009 | Evans et al. | 719/328 |
| 7,571,087 B1 | 8/2009 | Wheeler | |
| 7,702,499 B1 | 4/2010 | Lavagno et al. | |
| 7,966,622 B1 * | 6/2011 | Purser et al. | 719/321 |
| 2002/0059054 A1 | 5/2002 | Bade et al. | |
| 2006/0004554 A1 | 1/2006 | Vega et al. | |
| 2006/0128369 A1 * | 6/2006 | El Husseini et al. | 455/418 |
| 2007/0299650 A1 * | 12/2007 | Tamayo et al. | 703/27 |
| 2008/0225110 A1 | 9/2008 | Lin et al. | |
| 2008/0256394 A1 * | 10/2008 | Rashevsky et al. | 714/38 |
| 2008/0256591 A1 | 10/2008 | Li | |
| 2009/0300241 A1 * | 12/2009 | Young et al. | 710/68 |

FOREIGN PATENT DOCUMENTS

JP  11-194960  7/1999

OTHER PUBLICATIONS

"Camera Spoofing", TvTropes.org, Apr. 20, 2009, via WayBack Machine, Internet Archive, "http://web.archive.org/web/20090420030120/http://tvtropes.org/pmwiki/pmwiki.php/Main/CameraSpoofing", accessed on Sep. 26, 2012.*
"International Search Report", Mailed Date: Dec. 7, 2011, Application No. PCT/US2011/037432, Filed Date: Jun. 10, 2011, pp. 8.
"ManyCam Virtual Webcam, WDM Video Capture Driver", Retrieved at <<http://www.liutilities.com/device-driver/ manycam-virtual-webcam-wdm-video-capture-driver/>>, Retrieved Date: Apr. 20, 2010, pp. 3.

(Continued)

*Primary Examiner* — Joseph D Manoskey
(74) *Attorney, Agent, or Firm* — L. Alan Collins; Collins & Collins Intellectual, LLC

(57) ABSTRACT

A multimedia testing system is described herein that uses a virtual hardware driver to test software application behavior using virtual hardware in place of physical hardware devices. The virtual hardware driver receives customized input patterns that emulate behavior and formatting of data from a wide variety of hardware devices. For webcams, the system can send a steady stream of frames like those that would be provided as output from a physical webcam. A test environment can observe software interaction with the received customized input patterns to determine how the software will interact with various physical hardware devices. Thus, the multimedia testing system allows automated testing of a software application that interacts with multimedia hardware without physically buying and installing hardware devices.

20 Claims, 4 Drawing Sheets

(56) References Cited

OTHER PUBLICATIONS

"Virtual Camera 0.85", Retrieved at <<http://www.techspot.com/downloads/1571-virtual-camera.html>>, Retrieved Date: Apr. 20, 2010, pp. 3.

"Video2Webcam 3.1.5.2", Retrieved at <<http://www.xentrik.net/software/video2webcam.html>>, Retrieved Date: Apr. 20, 2010, pp. 3.

"IOXWebcam X", Retrieved at <<http://www.ioxperts.com/products/webcamx.html>>, Retrieved Date: Apr. 20, 2010, pp. 2.

* cited by examiner

MULTIMEDIA HARDWARE EMULATION FOR APPLICATION TESTING

BACKGROUND

Modern software typically involves many components often developed by large teams of software developers. The days of procedural programming in which a single developer could write an application that simply executed from start to finish performing a single, well-defined task are gone. A software developer often uses libraries, components, frameworks, and other bodies of code written by other developers. The chances for mistakes or misunderstanding how to use a particular external function or module are higher than ever.

Software today also often involves the use of one or more multimedia hardware devices, such as webcams and microphones. Increasingly, application frameworks are including access to multimedia devices. For example, MICROSOFT™ SILVERLIGHT™ 4 introduced webcam and microphone access to applications using that platform. Unfortunately, inclusion in the framework does not necessarily simplify a testing matrix for verifying correct software functionality.

Application testing and verification usually involves using software in a variety of real-world conditions to ensure that the software behaves correctly. Software testers often develop comprehensive suites of test passes that each verify that the software provides an expected response under one or more conditions. The conditions may include normal conditions as well as edge cases, input that should be recognized as invalid, and so forth.

The number of vendors now making multimedia devices and a wide-ranging set of capabilities make it more and more difficult for application developers to test the functionality of software that uses multimedia devices. Testing applications with each type of hardware is an expensive, time consuming, and difficult undertaking that is likely to delay introduction of new features and distribution of application updates. Setting up a testing environment that can handle the broad ranging set of real world conditions involves expensive hardware, running the test multiple times, or manual user intervention. For example, a test lab with 150 machines testing software for which there are even 10 models involves buying and installing large amounts of hardware.

SUMMARY

A multimedia testing system is described herein that uses a virtual hardware driver to test software application behavior using virtual hardware in place of physical hardware devices. The virtual hardware driver receives customized input patterns that emulate behavior and formatting of data from a wide variety of hardware devices. For webcams, the system can send a steady stream of frames like those that would be provided as output from a physical webcam. A test environment can observe software interaction with the received customized input patterns to determine how the software will interact with various physical hardware devices. The system also provides a configuration application-programming interface (API) that allows a test author to control the driver and switch patterns during testing to perform test runs on each of a selected set of hardware devices. Typically, a test author performs a registration process that registers the virtual hardware driver on a target computer system. The test author may also specify a set of images to be played as test frames of video by the driver or other configuration settings. Then, the test author runs a test that loads the application and the system provides the specified frames. Thus, the multimedia testing system allows automated testing of a software application that interacts with multimedia hardware without physically buying and installing hardware devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A multimedia testing system is described herein that uses a virtual hardware driver to test software application behavior using virtual hardware in place of many physical hardware devices. The virtual hardware driver receives customized input patterns that emulate behavior and formatting of data from a wide variety of hardware devices. For webcams, the system can send a steady stream of frames like those that would be provided as output from a physical webcam. A test environment can observe software interaction with the received customized input patterns to determine how the software will interact with various physical hardware devices. The system also provides a configuration application-programming interface (API) that allows a test author to control the driver and switch patterns during testing to perform test runs on each of a selected set of hardware devices. The system also provides other configuration settings such as frames per second, resolution, and so forth that a test author can modify to test software application behavior.

Typically, a test author performs a registration process that registers the virtual hardware driver on a target computer system. The test author may also specify a set of images to be played as test frames of video by the driver or other configuration settings. Then, the test author runs a test that loads the application. The application invokes a multimedia subsystem of an operating system on which it is running (e.g., APPLE™ QUICKTIME™). The multimedia subsystem loads the virtual hardware driver, which picks up the configuration settings and test frames and begins providing video input to the software application being tested. When the application completes, the application unloads the multimedia subsystem (which unloads the virtual hardware driver) and the test is complete. Thus, the multimedia testing system allows automated testing of a software application that interacts with multimedia hardware without physically buying and installing hardware devices.

Figure 1:
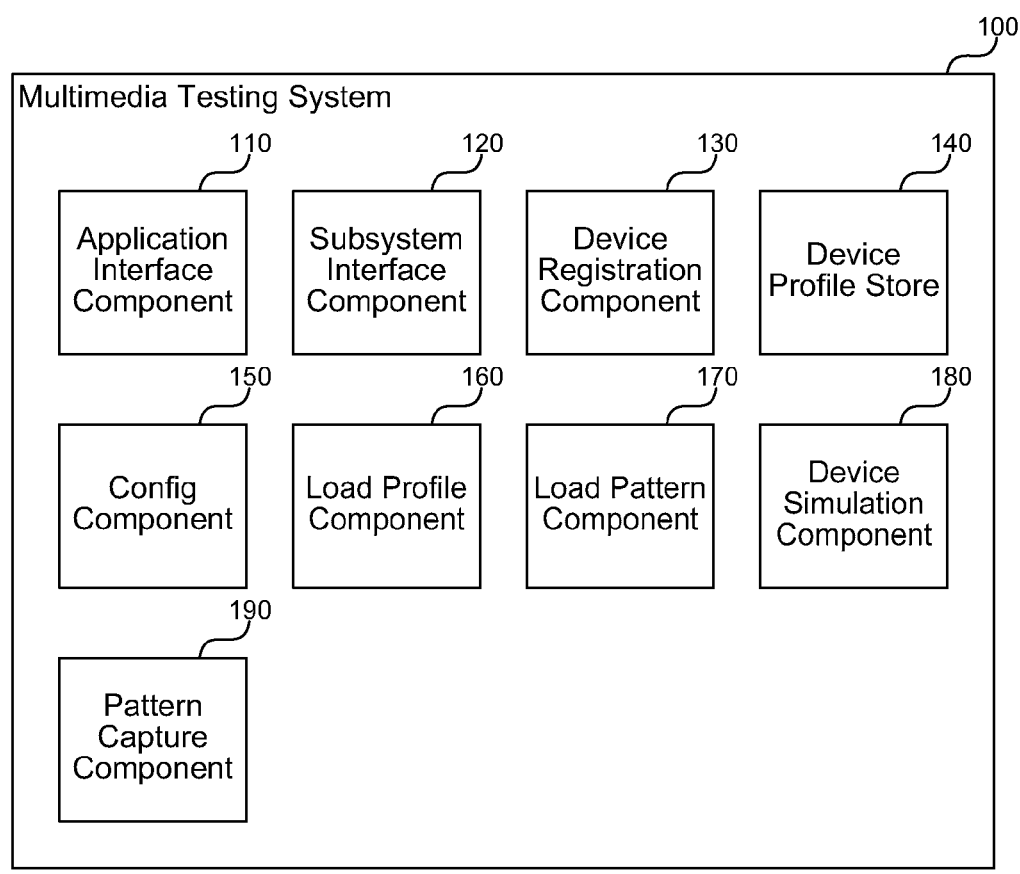
FIG. 1 is a block diagram that illustrates components of the multimedia testing system, in one embodiment.

FIG. 1 is a block diagram that illustrates components of the multimedia testing system, in one embodiment. The system 100 includes an application interface component 110, a subsystem interface component 120, a device registration component 130, a device profile store 140, a configuration component 150, a load profile component 160, a load pattern component 170, a device simulation component 180, and a pattern capture component 190. Each of these components is described in further detail herein.

The application interface component 110 provides an interface to one or more applications through which the applications can interact with a virtual multimedia hardware device. For some operating systems, the operating system isolates applications from hardware by providing a multimedia access interface through which the application communicates with devices. For example, APPLE™ provides the QUICKTIME™ interface and MICROSOFT™ provides DIRECTX™ for accessing multimedia hardware. In such cases, the application interface component 110 may expose an interface to the operating system provided interface, which then exposes access to applications.

The subsystem interface component 120 provides an interface to one or more operating system subsystems that receive multimedia hardware device input. In some cases, the subsystem interface component 120 includes a virtual hardware driver or other operating system extension that interacts with an operating system kernel to perform actions similar to those of physical hardware devices. The virtual hardware driver provides the system 100 with low-level access to the operating system for emulating particular hardware devices and providing test data as input to one or more applications. The subsystem interface component 120 may interface with physical hardware in addition to the simulation provided.

The device registration component 130 performs installation of one or more virtual hardware devices on a computer system, so that applications running on the computer system can access the virtual hardware devices. For example, the component 130 may modify operating system data stores, such as a registry or other configuration database, to inform the operating system about the presence of the virtual hardware devices.

The device profile store 140 stores device profiles that describe attributes of one or more multimedia devices that the system 100 can emulate. The store may include one or more files, file systems, databases, cloud-based storage services, or other facilities for storing information. The device profile store 110 stores a variety of attributes including (e.g., for webcam devices) video resolution, default frame rate, highest and lowest available frame rates, video format, video dimensions, and so forth. This information can be applied to generate simulated video input for one or more applications that use hardware devices of a particular type associated with the profiles. The device profile store 140 may also store one or more error conditions, such as how often to lose/drop a video frame, stuttering, audio synchronization conditions, and so forth. These can be used to present an application with realistic conditions that occur on physical hardware, so that the reaction of the application can be tested in a test environment.

The configuration component 150 provides an interface to users or test applications for configuring the system 100. For example, the interface may provide one or more configuration dialogs through which a user can select a particular device profile, set of test pattern input data, error conditions to introduce into the input, and so forth. In some embodiments, the configuration component 150 provides an application programming interface (API) through which a test application can programmatically configure the system 100 to achieve a particular mix of device characteristics and patterns for a particular test run. In some cases, the test application may dynamically invoke the configuration interface as a test suite runs to set up various test conditions, run a test, and then select a next hardware setup for testing. In some embodiments, the component 150 receives configuration from a file. Some operating systems, such as Mac OS X, will not allow communication with a driver after it is loaded. However, a test application can provide configuration information in a file that the driver can load to receive the configuration information.

The load profile component 160 receives an indication of an identified profile from a user or test harness, and loads information related to the profile from the device profile store 140. In some embodiments, the user indicates to the test framework that they wish to simulate a particular device by enabling the device emulation functionality. The user then selects a profile from a configuration dialog indicating which characteristics they would like to simulate. For example, the user may select a Logitech webcam profile. When the test run starts, the load profile component 160 configures the device simulation component 180 and starts device emulation as specified in the profile. When the run finishes, the application closes causing the device to unload and simulation to stop.

The load pattern component 170 receives an indication of one or more test data patterns to provide in a mix of multimedia input for testing software code. When creating a test, a user specifies a set of scenarios to run. Each scenario includes a set of tests and one or more virtual devices. The user also specifies a test data "mix." The test data is a series of one or more frames that the system 100 plays back and potentially repeats depending on configuration settings. This will allow the test to simulate different devices and different types of input from those devices. For example, the system might simulate a 320×240 video stream from a webcam from one manufacturer, followed by an HD video stream from a webcam from another manufacturer.

The device simulation component 180 applies one or more selected device profiles at runtime to exhibit characteristics defined by the selected profiles during testing of software code. When an application that uses multimedia devices starts, device emulation starts. The device simulation component 180 takes an inventory of the devices that are configured to run and provides input related to those devices. The component 180 then begins playing back video frames or providing other test data patterns to the application. In some embodiments, the device simulation component 180 and other components are provided as an extension or built-in feature of an integrated development environment (IDE), such as MICROSOFT™ Visual Studio or APPLE™ Xcode. This allows software developers to write software code and then setup device-based testing of the code in the same environment.

The pattern capture component 190 provides an administrative tool for capturing test data from one or more physical hardware devices. A tester may install a physical hardware device and run the tool to capture information about the installed hardware, such as resolution, frame rate, and other data. In addition, the tool may capture real output produced by the hardware and save this output to serve as data patterns provided by the load pattern component 170 during testing on other machines that do not have the physical hardware installed. The pattern capture component 190 can produce device profiles and test data patterns for use during testing. In this way, a test engineer can install physical hardware devices once, capture information about the devices, and then provide a similar virtual environment on a lab of test computer systems.

The computing device on which the multimedia testing system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
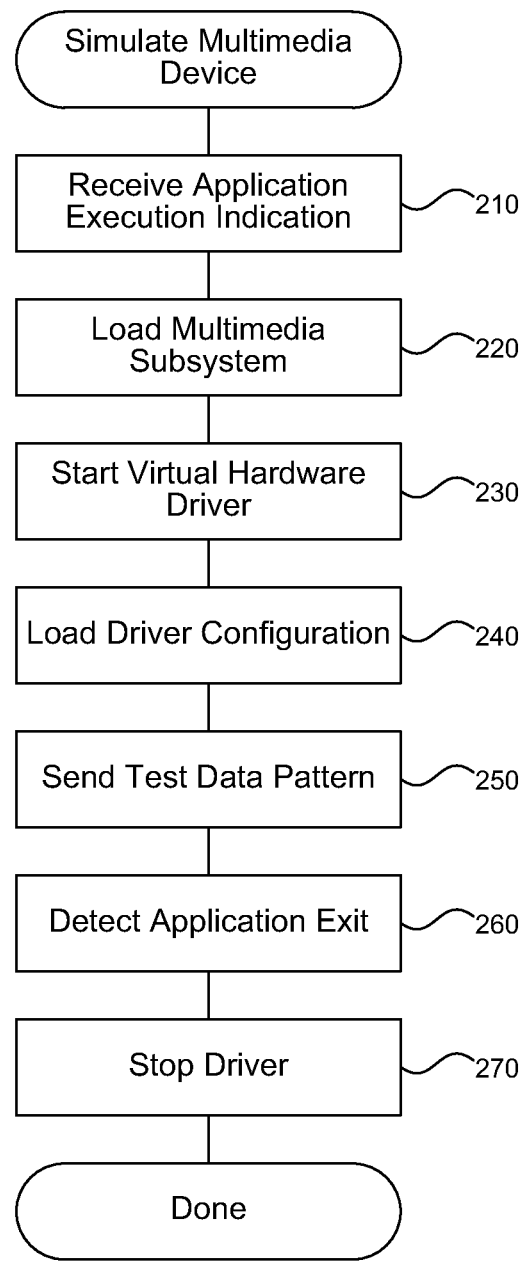
FIG. 2 is a flow diagram that illustrates processing of the multimedia testing system to simulate a multimedia device, in one embodiment.

FIG. 2 is a flow diagram that illustrates processing of the multimedia testing system to simulate a multimedia device, in one embodiment. Beginning in block 210, the system receives an indication that a user invoked an application that uses multimedia facilities of an operating system. For example, the user may run the application from an operating system desktop. The application may use a webcam or other multimedia devices to receive video data. Continuing in block 220, the system loads an operating system multimedia subsystem to interact with multimedia hardware. For example, if the application is running on Mac OS X, then the system loads the QuickTime subsystem. Continuing in block 230, the system starts a virtual hardware driver that emulates one or more multimedia hardware devices. For example, the virtual hardware driver may have been installed on a computer system by a previous installation process that registers the driver with the operating system.

Continuing in block 240, the system loads configuration information that specifies one or more device profiles and one or more data patterns to emulate using the virtual hardware driver. The system may receive the configuration information from a configuration file or other data store. If no configuration information is found, then the system may emulate a default device and provide default frames to the application. In some embodiments, the system may present a user interface or API from which a user or test program receives a list of available device profiles and/or data patterns to use. The system may provide a variety of configurable inputs that can be set as appropriate for each particular device profile. For example, the configuration information may include settings for video size, frame rate, encoding, and so forth.

Continuing in block 250, the system provides the specified one or more data patterns to the application as output from the emulated multimedia hardware devices. For example, the system may send a set of frames in a loop to the application. At this point, the system may start one or more tests specified by an application developer that test target software code under a load produced by the specified data pattern. Various tests can be provided by the application developer with the multimedia testing system providing emulated hardware devices against which to perform the tests. After running one or more tests, a test application may stop the driver, reconfigure the driver, and restart the driver for the next test.

Continuing in block 260, the system detects that the application has quit executing. For example, the system may register an event that is signaled when the application completes or may receive another notification that the application has closed. Continuing in block 270, the system stops and unloads the virtual hardware driver. In some embodiments, the application releases the multimedia subsystem when the application closes, which in turn stops the driver. This allows the system to clean up any changes made to the system and to collect any final data before closing. After block 270, these steps conclude.

Figure 3:
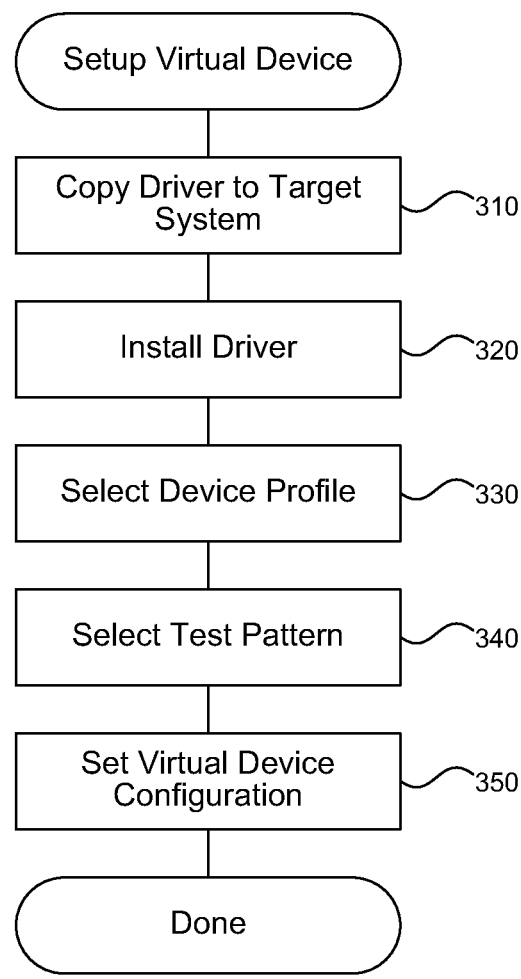
FIG. 3 is a flow diagram that illustrates processing of the multimedia testing system to setup a virtual device and configure a test run, in one embodiment.

FIG. 3 is a flow diagram that illustrates processing of the multimedia testing system to setup a virtual device and configure a test run, in one embodiment. Beginning in block 310, the system copies a virtual hardware driver to a target computer. Copying may include copying a driver file as well as one or more configuration files to the target computer. Continuing in block 320, the system installs the copied virtual hardware driver so that the driver is available for use by an operating system. Each operating system has different requirements for installing drivers and other extensions, and the system performs the steps appropriate to install the driver on the particular operating system of the target computer.

Continuing in block 330, the system selects a device profile to emulate in a subsequent test run, wherein the device profile specifies one or more parameters of a physical hardware device that the virtual hardware driver will emulate. For example, the physical hardware device may have a particular default frame rate at which the virtual hardware driver will provide video frames from a test pattern. Continuing in block 340, the system selects a test pattern that specifies data to provide to an application from the virtual hardware driver. The test pattern is the data that would normally come from a physical hardware device, but is provided instead by the virtual hardware driver to avoid installing the physical hardware device on the target computer.

Continuing in block 350, the system stores a virtual device configuration file that specifies the selected device profile and selected test pattern in a location that the virtual hardware driver will load upon invocation by the application. After block 350, these steps conclude.

Figure 4:
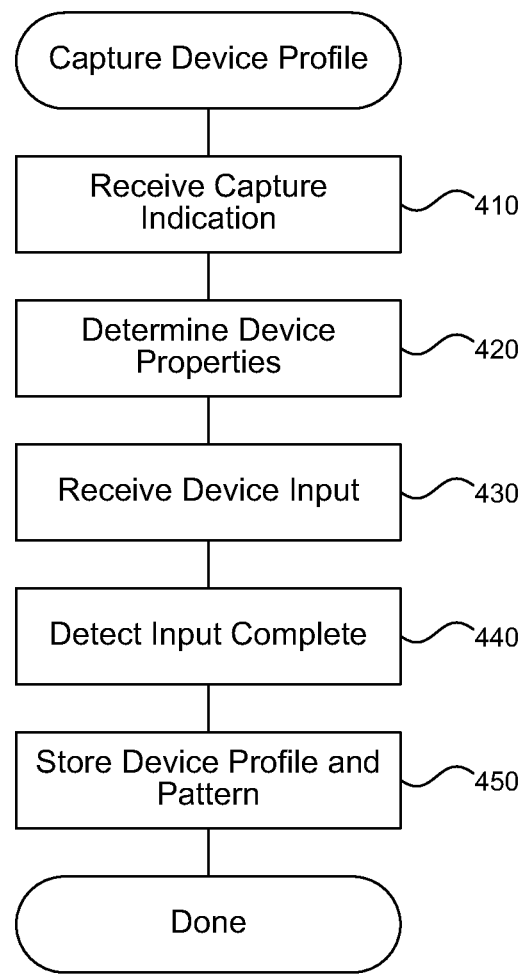
FIG. 4 is a flow diagram that illustrates processing of the multimedia testing system to capture a device profile, in one embodiment.

FIG. 4 is a flow diagram that illustrates processing of the multimedia testing system to capture a device profile, in one embodiment. Beginning in block 410, the system receives an indication to capture device profile information for a specified physical hardware device attached to a computer. For example, a user may run a tool on a target computer that enumerates the multimedia devices attached to the computer and stores information about the attached devices. Continuing in block 420, the system determines one or more device properties that describe behavior of the physical hardware device. For example, the hardware device may include particular default settings or enumerated available formats that the device can produce. The settings may include video dimensions, frames per second, format, and other settings.

Continuing in block 430, the system receives input from the physical hardware device that includes one or more frames of multimedia data. For example, if the device is a webcam, then the system may capture video frames until a user requests that the system stop. This allows a test engineer to capture real data output by a device against which software is to be tested, and later play back the captured data on a computer that does not have the physical hardware device installed. Continuing in block 440, the system detects that the device input is complete. For example, a user may signal the system to stop capturing input data.

Continuing in block 450, the system stores a device profile and captured test pattern for subsequent use during testing. For example, the system may store a configuration file that includes a device profile and one or more image files that represent video frames to be provided as test input to a software application. After block 450, these steps conclude.

In some embodiments, the multimedia testing system provides a universal driver that works on multiple operating system versions. For example, the APPLE™ software platform allows for universal binaries that will work on Tiger, Leopard, and Snow Leopard versions of Mac OS X. In addition, the APPLE™ iPhone and iPad can use universal binaries that run on both devices. A universal binary includes multiple compiled versions of an application stored in a single application package, each written to work with a particular operating system version or hardware environment. The operating system loader detects the multiple versions of the application in the package and selects the current one for the environment in which the universal binary is running.

In some embodiments, the multimedia testing system integrates the driver with a platform-testing infrastructure. For example, for MICROSOFT™ SILVERLIGHT™ applications, the system can integrate the driver into the platform for testing applications that use multimedia hardware. The system provides an API for applications to start and stop the driver, so that an application developer can write test code that invokes the application and performs any desired testing.

In some embodiments, the multimedia testing system operates on mobile devices to provide a test harness for testing applications against possible hardware devices that could be attached or accessed by the mobile device. For example, a mobile phone application may include functionality for capturing input camera data for placing a video call. The system can allow the application developer to test the application without trying each possible camera that could be attached to the mobile device and provide the input data.

In some embodiments, the multimedia testing system is used for purposes other than testing. For example, the system can be used to capture multimedia data at one location and provide it to an application running on a different computer. This allows remoting video data using the framework described herein. Accordingly, the uses described herein are examples of how the system can be used and not limits of the capabilities of the system.

In some embodiments, the multimedia testing system emulates multiple hardware devices at the same time. For example, the system can be used to emulate multiple webcams and to provide test input data from each emulated webcam similar to the data output by physical hardware devices.

In some embodiments, the multimedia testing system is used to test a podcast or other live streaming by providing an old stream that appears as a live stream. Live streams are difficult to test before the event because there is not video data until the event begins. However, the multimedia testing system can provide input data at any time using one or more test patterns so that a setup for the live event can be tested in advance. In addition, the system allows insertion of advertisements or other video data before the start of the live event.

From the foregoing, it will be appreciated that specific embodiments of the multimedia testing system have been described herein for purposes of illustration, but that various modifications may be made without deviating from the spirit and scope of the invention. Accordingly, the invention is not limited except as by the appended claims.

We claim:

1. A computer-implemented method for simulating a multimedia device for application testing, the method comprising:
    receiving an indication that a user invoked an application that uses multimedia facilities of an operating system;
    loading an operating system multimedia subsystem to interact with multimedia hardware;
    starting a virtual hardware driver that emulates one or more multimedia hardware devices using software and without connecting a physical hardware device;
    loading configuration information that specifies one or more device profiles and one or more data patterns to emulate using the virtual hardware driver; and
    providing the specified one or more data patterns to the application as output from the emulated multimedia hardware devices,
    wherein the preceding steps are performed by at least one processor.

2. The method of claim 1 wherein receiving the indication that the user invoked the application that uses multimedia facilities comprises detecting that the application uses input from a webcam.

3. The method of claim 1 wherein loading the operating system multimedia subsystem comprises loading Apple QuickTime for capturing video data from a webcam.

4. The method of claim 1 wherein starting the virtual hardware driver comprises identifying drivers installed on a computer system by a previous installation process that registered the driver with the operating system.

5. The method of claim 1 wherein starting the virtual hardware driver comprises loading a universal binary and detecting a version of the operating system to select executable code within the universal binary.

6. The method of claim 1 wherein starting the virtual hardware driver comprises starting the driver to emulate multiple multimedia devices that provide input to the application at the same time.

7. The method of claim 1 wherein loading configuration information comprises receiving the configuration information from a configuration file.

8. The method of claim 1 wherein loading configuration information comprises detecting that a configuration file is missing and emulating a default device and providing one or more default frames to the application.

9. The method of claim 1 wherein loading configuration information comprises presenting a user interface from which a user receives a list of available device profiles from which to select.

10. The method of claim 1 wherein loading configuration information comprises providing an Application Programming Interface (API) through which test program receives a list of available device profiles from which to select.

11. The method of claim 1 wherein providing the specified one or more data patterns comprises feeding video frames to the application in a loop to emulate output from a webcam.

12. The method of claim 1 further comprising, while providing the specified one or more data patterns, invoking one or more tests to test behavior of the application while receiving the test data patterns.

13. A computer system for emulating multimedia hardware for software application testing, the system comprising:
    a processor and memory configured to execute software instructions embodied in the following components;

an application interface component configured to provide an interface to one or more applications through which the applications can interact with a virtual multimedia hardware device;
a subsystem interface component configured to provide an interface to one or more operating system subsystems that receive multimedia hardware device input;
a device registration component configured to perform installation of one or more virtual hardware devices on a computer system to allow one or more applications running on the computer system to access the virtual hardware devices;
a device profile store configured to store device profiles that describe attributes of one or more multimedia devices that the system can emulate;
a configuration component configured to provide an interface for configuring the system;
a load profile component configured to receive an indication of an identified profile and loads information related to the profile from the device profile store;
a load pattern component configured to receive an indication of one or more test data patterns to provide in a mix of multimedia input for testing a software application; and
a device simulation component configured to apply one or more selected device profiles at runtime to exhibit characteristics defined by the selected profiles during testing of the software application, wherein the virtual hardware devices are implemented using software and without connecting a physical hardware device.

14. The system of claim 13 wherein the subsystem interface component is further configured to include a virtual hardware driver that interacts with an operating system kernel to provide input similar to that of a physical hardware device.

15. The system of claim 13 wherein the device profile store is a configuration file that the driver can access during execution to load one or more configuration parameters.

16. The system of claim 13 wherein the device profile store includes frames of video to provide to an application being tested, wherein the application is designed to receive video input from a webcam.

17. The system of claim 13 wherein the configuration component is further configured to receive a selection of a particular device profile and a set of test pattern input data.

18. The system of claim 13 further comprising a pattern capture component configured to provide an administrative tool for capturing test data from one or more physical hardware devices.

19. A computer-readable storage comprising instructions for controlling a computer system to setup a virtual webcam device and configure the device for a test run, wherein the instructions, upon execution, cause a processor to perform actions comprising:
copying a virtual hardware driver to a target computer;
installing the copied virtual hardware driver so that the driver is available for use by an operating system;
selecting a device profile to emulate during the test run, wherein the device profile specifies one or more parameters of a physical hardware device that the virtual hardware driver will emulate using software and without connecting a physical hardware device;
selecting a test pattern that specifies data to provide to an application from the virtual hardware driver; and
storing a virtual device configuration file that specifies the selected device profile and selected test pattern in a location that the virtual hardware driver will load upon invocation by the application.

20. The computer-readable storage device of claim 19 wherein the test pattern is the data that would normally come from a physical hardware device, but is provided instead by the virtual hardware driver to avoid installing the physical hardware device on the target computer.

* * * * *